United States Patent Office 3,012,075
Patented Dec. 5, 1961

3,012,075
DESULFURIZATION OF TETRAORGANO-
DIPHOSPHINE DISULFIDES
Heinz Niebergall and Bruno Langenfeld, Frankfurt am Main, Germany, assignors to Koppers Company, Inc., a corporation of Delaware
No Drawing. Filed Apr. 1, 1959, Ser. No. 803,351
Claims priority, application Germany Apr. 17, 1958
14 Claims. (Cl. 260—606.5)

This invention relates to the desulfurization of tetraorganodiphosphine disulfides. In one specific aspect, it relates to a one-step process for making diorganophosphines by desulfurization of the starting material and a cleavage of the P—P bond of the reaction intermediate. In another aspect, it relates to the preparation of tetraorganodiphosphines from the tetraorganodiphosphine disulfides by desulfurization.

In our copending application S.N. 77,045, filed December 9, 1958, now U.S. Patent No. 2,959,621, we described and claimed a method for making dialkylphosphines and tetraalkyldiphosphines from dialkylhalophosphines. In one embodiment of the method described therein, dialkylphosphines are prepared in one step from the dialkylhalophosphines in yields of 90% and higher. Although this achievement shows a considerable advantage over the prior art processes, which provide the desired dialkylphosphines in yields of only 50% or lower, the method is limited by the choice of suitable starting materials to the preparation of alkylphosphines. Quite surprisingly, we have now discovered a novel method of making a broader class of organophosphines from more readily obtainable starting materials, the tetraorganodiphosphine disulfides. Under suitable conditions, hereafter described, we can accomplish, in one step, desulfurization of the tetraorganodiphosphine disulfide and cleavage of the P—P bond of the reaction intermediate to produce in high yield diorganophosphines. We have also found that our new method can be conducted stepwise to obtain the valuable tetraorganodiphosphines and metal salts of diorganophosphines as products of the intermediate reactions.

It is, therefore, an object of the invention to provide a one-step method for making diorganophosphines in yields of about 75–90%. It is a further object of the invention to provide a new and efficient method for making in excellent yield tetraorganodiphosphines and metal salts of diorganophosphines.

In accordance with the invention, a tetraorganodiphosphine disulfide is contacted at an elevated temperature with an inorganic reductant, which comprises a metal of the 4th, 5th or 6th periods of groups IB, IIB, IVA, VA and VIII of the long form of the periodic table or a metal hydride of an alkali or alkaline earth metal, and a desulfurized phosphine is recovered from the reaction mixture. The particular phosphine obtained using the method of the invention depends upon the predetermination of the specific reaction conditions as hereafter described.

The tetraorganodiphosphine disulfides useful in the invention have the general formula:

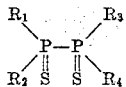

wherein $R_1$, $R_2$, $R_3$ and $R_4$ are lower alkyl, aryl, lower alkaryl, cycloalkyl and aryl lower alkyl radicals. Exemplary starting materials include tetramethyldiphosphine disulfide, tetraethyldiphosphine disulfide, tetra-n-butyldiphosphine disulfide, tetraphenyldiphosphine disulfide, tetratolyldiphosphine disulfide, tetrabenzyldiphosphine disulfide, tetra cyclohexyldiphosphine disulfide, and the like.

The inorganic reductant useful in the invention comprises two classes of materials; (1) hydrides of metals selected from groups IA and IIA of the long form of the periodic table (Handbook of Chemistry and Physics, 39th edition (1957–8) pp. 400–401) and (2) metals, which do not readily form ionic hydrides, of the 4th, 5th and 6th periods of groups IB, IIB, IVA, VA and VIII of the periodic table. Exemplary metals of the first group include lithium, sodium, potassium, beryllium, magnesium, calcium, strontium and barium. These metals are used in the invention in the form of their hydride, which can be preformed before contacting it with the tetraorganodiphosphine disulfide or formed in situ by contacting the particular metal with the tetraorganodiphosphine disulfide in an atmosphere of hydrogen. Suitable metals of the second class include copper, silver, zinc, cadmium, tin, lead, arsenic, antimony, bismuth, iron, cobalt, nickel, ruthenium, palladium and platinum. Preferred metals for use in the invention are iron, cadmium, lead and copper.

The reaction is effected by intimately mixing the comminuted metal or metal hydride with the tetraorganodiphosphine disulfide and heating the mixture at an elevated temperature until reaction ocurs. The reaction is usually completed within a few minutes and the product is conveniently recovered by distillation, if desired, in a vacuum. Alternatively, the tetraorganodiphosphine disulfide is flowed in gaseous form over the metal or metal hydride in a heated tube.

The yield of product and the particular product obtained by the method of the invention are governed by a variety of factors, including the specific metal used, the physical nature of the metal, the presence or absence of hydrogen, the number of chemical equivalents of metal present for each mole of tetraorganodiphosphine disulfide, the reaction temperature, the rate of heating and the method of product recovery.

The effects of the specific metal used and the physical form of the metal upon the reaction are closely interrelated. Since a solid-solid reaction is contemplated, all of the metals are used in finely divided form to insure uniformity of contact between the metal (or metal hydride) and the tetraorganodiphosphine disulfide. In the case of metals which do not readily form hydrides, such as copper, iron, nickel, and the like, the activity of such metals as reductants and as catalyst is influenced by control of their surface area and other pre-treating techniques well known in the art. While all of the metals mentioned hereabove are suitable, in finely divided form, for purposes of the invention, the method by which certain of the metals are prepared may enhance their suitability for the reaction. For example, the well-known Raney copper and Raney nickel, which contain adborbed hydrogen, are especially effective. An active copper or iron, i.e. one that has been chemically reduced prior to use, is also particularly desirable. Electrolytic or inactive copper, for example, is effective in the invention, although in general it must be used with a more careful control of reaction conditions to provide the desired high yields of product.

The presence of hydrogen influences considerably the nature of the product obtained, but the amount of hydrogen used is not critical. We have already noted that it is necessary to use hydrogen with the alkali and alkaline earth metals in order to form the metal hydrides in situ, since the metals of this class must be present in the form of their hydride in order to be effective. The use of an atmosphere of hydrogen with the metals of the second class is not altogether necessary, although it is quite beneficial if one desires to obtain the diorganophosphine as the principal final product. Hydrogen, when present during the reaction, serves as a supplemental reducing agent, as an entrainer in which the products can be removed and as a protective blanket to protect the products from oxidation. Generally speaking, when the metals which do not readily form hydrides are used in the absence of hydrogen, the principal product obtained is the tetraorganodiphosphine. When hydrogen is present, using these same metals, the principal product is, under ordinary conditions, a diorganophosphine. When the metal hydrides are used (either preformed or formed in situ), a mixture of products, containing a major portion of tetraorganodiphosphine and a minor portion of diorganophosphine, is sometimes formed, although the specific product obtained in this case is measurably influenced by the number of chemical equivalents of metal hydride present.

The number of chemical equivalents of metal or metal hydride used should be at least equal to, and preferably in excess of, the stoichiometric requirement based upon the number of moles of tetraorganodiphosphine disulfide present. If a considerable excess over the stoichiometric amount is present, e.g. a 5 to 10 fold excess, the nature of the products obtained by the method of the invention is influenced to a greater extent. This is particularly true when using an excess of the hydrides of active and strongly basic metals such as sodium and potassium. In that case, there is a tendency to form as a product the diorganophosphine metal salt instead of the free diorganophosphine. The metal salt can be decomposed, if desired, to form the diorganophosphine by adding a proton donor to the reaction mixture, as hereafter described.

The reaction is effected at an elevated temperature, generally between about 125 and 350° C. Since it is strongly exothermic in nature, the rate of heating effects the yield and also the particular product obtained. It is generally desirable to heat the reaction mixture slowly up to the temperature at which the exothermic reaction begins. The temperature will then be raised at a more gradual rate by the heat given off during the reaction. If, using an active catalyst, too much heat is applied initially, control of the reaction is difficult to maintain and pyrolysis may occur. In this case the yield of product will be greatly diminished. A controlled, rapid heating tends (in the absence of reflux) to drive off the tetraorganodiphosphine as it is formed and, thus, under such conditions, it is the principal product recovered. If the rate of heating is more gradual, the intermediate tetraorganodiphosphine stays in the reaction mixture and is converted in one step to the desirable diorganophosphine (or metal salt thereof, depending upon the stoichiometry and the particular metal chosen). By using a gradual heating technique, the desired diorganophosphine can be obtained, even in the absence of hydrogen. By using a rapid, but controlled heating, and removing the product as it is formed, it is possible to recover the tetraorganodiphosphine in the presence of a hydrogen atmosphere.

It is sometimes desirable, although not necessary, to conduct the reaction in the presence of a suitable solvent, i.e. a solvent which does not decompose either the products or the reactants. The use of a solvent helps to promote intimate contact between the tetraorganodiphosphine disulfide and metal or metal hydride. If the reaction conditions described hereabove are selected to provide as a principal product the diorganophosphine, it is advisable in certain cases, particularly in the case of the dialkylphosphines, to select an aromatic or hydroaromatic hydrocarbon solvent such as decalin, tetralin, toluene, xylene, cumene, cymene, and the like. The choice of solvent in this particular case is restricted because of the tendency of the dialkylphosphines to form azeotropes with certain oxygenated solvents, such as dibutyl ether. If the predetermined reaction conditions provide the tetraorganodiphosphine as the principal product, ether, dioxane, tetrahydrofuran, paraffins, cycloparaffins, and similar solvents, may be used in addition to those mentioned hereabove. In this case, the only limitations placed upon the choice of solvent are that it does not interfere with the course of the reaction and that it has a boiling point which is sufficiently different from the boiling point of the particular desired product.

It is often helpful to blanket the reaction mixture with an inert gas, such as nitrogen, to protect the reaction products from oxidation. We have already noted that hydrogen, if present, will serve this purpose.

The formation of the various products and intermediates according to the method of the invention is more clearly understood when reference is made to the following equations. In the equations R has the values given hereinabove for $R_1$, $R_2$, $R_3$ and $R_4$. M represents a metal hereinbefore described as useful in the invention. Equation 1 shows the formation of the tetraorganodiphosphine in the presence of a suitable metal.

(1) 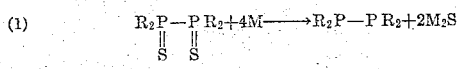

Equations 2, 3 and 4 show the conversion of the tetraorganodiphosphine to the diorganophosphine or to the metal salt of the diorganophosphine.

(2) 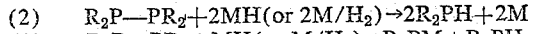
(3) 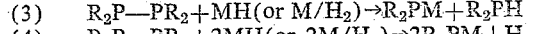
(4) 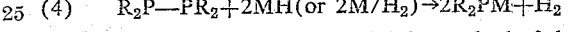

Tetraalkyldiphosphines obtained by the method of the invention can be converted in the presence of an alkali metal to a metal salt of the dialkylphosphine which can be decomposed with a proton donor, e.g. alcohol, organic acid or water, according to the method of our copending application S.N. 779,045, now U.S. Patent No. 2,959,621, to provide the desirable dialkylphosphines. Other tetraorganodiphosphines undergo the same general reactions, although the permissible reaction conditions vary. These reactions are shown below in Equations 5 and 6.

(5) 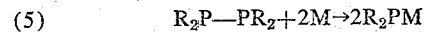
(6) $R_2PM + R'OH (\text{or } R'COOH \text{ or } H_2O) \rightarrow R_2PH + MOR'$ wherein R' is lower alkyl including cycloalkyl. The combined desulfurization and P—P bond cleavage is shown in Equations 7, 8 and 9.

(7) 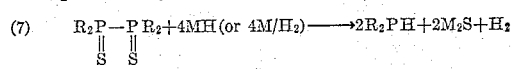

(8) 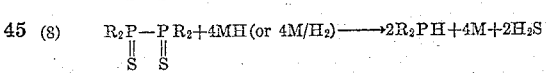

(9) 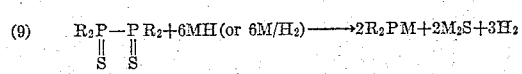

The metal salts of the organophosphines may be converted to the organophosphines by the action of alcohol, organic acid or water as hereinbefore described.

The tetraorganodiphosphines and the diorganophosphines of the invention are strong reducing agents. They are, because of their strong odor and activity, very effective as warning chemicals when added to industrial gases in small amounts, e.g. 0.5 to 1% by volume. Tetramethyldiphosphine has been shown to form on reaction with boranes, e.g. pentaborane, highly heat stable polymers. The other organophosphines produced by the method of the invention are similarly useful. Additional uses for certain of the diorganophosphines and the diorganophosphine metal compounds are given in U.S. Patents No. 2,437,796 and 2,437,797.

Our invention is further illustrated by the following examples.

Example I 0.1 mol (18.6 gr.) tetramethyldiphosphine disulfide and 0.6 gram atom (33.5 gr.) ferrum reductum were well mixed in a 100 cc. round flask provided with a 10 cm. long ascending tube to which was connected an air-cooled descending condenser. The reaction was started with the flame of a Bunsen burner. The greyish black mixture became colored a deep black at one place, and the reaction then continued throughout the entire mass without further supply of heat. On supplying additional heat, tetramethyldiphosphine was distilled with lively boiling and constant reflux into the receiver in a temperature range of 135 to 152°. The reaction was completed in 15 minutes. Toward the end it was heated to a faint red heat.

Redistillation gave 11 gr. of a pure tetramethyldiphosphine (boiling point 138° C.) in a yield of 90% of theory.

Example II 0.1 mol (18.6 gr.) tetramethyldiphosphine disulfide and 0.4 gram atom (22.4 gr.) ferrum reductum were reacted in the apparatus described in Example I under the conditions given therein.

Redistillation gave 10.8 gr. of a pure (according to boiling point) tetramethyldiphosphine in a yield of 89% of theory.

Example III 0.1 mol (18.6 gr.) tetramethyldiphosphine disulfide were reacted with 0.6 gram atom (38 gr.) copper (electrolytic, pulverized) in the apparatus described in Example I under the conditions described therein. Both components were mixed with one another and first heated slowly with a free flame. The reaction started at about 230° C. with a considerable evolution of smoke. As soon as the white vapors were expelled, a pure (according to boiling point) tetramethyldiphosphine was evenly distilled off.

The yield was 9.8 gr., equivalent to 80% of theory.

Example IV 0.1 mol (18.6 gr.) tetramethyl diphosphine disulfide and 0.6 gr. atom (67.0 gr.) pulverized metallic cadmium were reacted in the apparatus described in Example I under the conditions described therein. The reaction started with a slightly increased temperature and proceeded without formation of apparent side products. Small amounts of dimethylphosphine collected in the condenser connected to the receiver.

The yield of pure (according to boiling point) tetramethyldiphosphine was 9.1 gr., equivalent to 75% of theory.

Example V

A mixture of 0.08 mol (10 gr.) tetramethyldiphosphine, 0.16 gram atom (6.4 gr.) potassium, and 20 gr. decalin (which was distilled over potassium) was slowly heated in an oil bath with intensive stirring in a 100 cc. four-necked flask provided with a conical, sharp stirrer, an ascending tube, a nitrogen admission tube, and a condenser connected to the ascending tube. At about 30° C. the potassium salt of dimethyl phosphine, having a greenish blue color, was formed. The temperature was then increased to 80 to 100° C. and maintained for one hour. After cooling the pasty composition, the potassium salt was treated dropwise with 13 cc. absolute methanol (about 100% excess) and heated for another hour at 100° C. The dimethylphosphine, which distilled over at 20.5° C., in the redistillation was collected in the condenser.

The yield amounted to 9 gr. dimethylphosphine, equivalent to 88.2% of theory.

Example VI 0.1 mol (12.2 gr.) tetramethyldiphosphine and 0.4 gram atom (25.4 gr.) Raney copper in 15 cc. decalin were heated to gentle boiling in the apparatus described under Example V while introducing a slow stream of hydrogen. 9.9 gr. (80% of theory) of dimethylphosphine were obtained thereby.

The Raney copper was previously washed with absolute methanol and heated to 60° C. for one hour at 3 mm. mercury.

Example VII 0.1 mol (18.6 gr.) tetramethyldiphosphine disulfide and 0.4 gram atom (25.4 gr.) Raney cooper-active copper mixture were suspended in 25 cc. decalin and heated to gentle boiling while introducing a slow stream of hydrogen (apparatus as in Example V).

The yield amounted to 9 gr. dimethylphosphine, equivalent to 74.5% of theory.

Example VIII 0.1 mol (18.6 gr.) tetramethyldiphosphine disulfide and 0.4 gram atom (25.4 gr.) active copper (intimately mixed with one another) were slowly heated in the apparatus described in Example I while introducing a slow stream of hydrogen. Colorless dimethylphosphine having a boiling point of 21° C. was condensed in the condenser.

The yield amounted to 11.2 gr. dimethylphosphine, equivalent to 90% of theory.

Example IX

A 100 cc. round flask was provided with a 10 cm. long ascending tube to which was connected a descending, air-cooled condenser, which discharged in an air-cooled receiver and in turn was connected to a condenser cooled to −78° C. An intimate mixture of 0.1 mol (18.6 gr.) tetramethyldiphosphine disulfide and 0.6 gram atom (38 gr.) pulverized copper was slowly heated in the round flask. The reaction was completed after ten minutes. 6.7 gr. tetramethyldiphosphine, equivalent to 55% of theory, were collected in the air-cooled receiver and 4.1 gr. dimethylphosphine, equivalent to 33% of theory, were collected in the condenser cooled to −78° C.

Example X 0.1 mol tetramethyldiphosphine disulfide and 0.4 mol sodium hydride were reacted with heating in the apparatus described in Example IX. Dimethylphosphine and tetramethyldiphosphine were obtained thereby in the ratio of 1:3 with a total yield of about 50% of theory.

Example XI

The procedure of Example I was followed, using reduced iron as the inorganic reductant. A volatile red intermediate formed, which decomposed and distilled over as tetramethyldiphosphine. With very slow heating and a reactant ratio of 0.4 mole of tetramethyldiphosphine disulfide to 1.6 gram atoms of iron, an 83% yield of tetramethyldiphosphine and trace amounts of dimethylphosphine were obtained.

Example XII

Following the procedure of Example I and using the identical quantities of the starting materials, with the exception that copper was used as the inorganic reductant, the reaction mixture was heated gradually until reaction occurred. A 73% yield of dimethylphosphine was thus obtained.

Example XIII

The procedure of Example XII was followed exactly, with the exception that a slow stream of hydrogen was passed over the reaction mixture. A 90% yield of dimethylphosphine was thus obtained.

Example XIV 18.6 grams of tetramethyldiphosphine disulfide and 8.2 grams of powdered calcium hydride were mixed and heated in the apparatus described in Example IX. Heat was applied slowly using a small flame and after prolonged heating a white vapor distilled over, from which was obtained a 30% yield of tetramethyldiphosphine and dimethylphosphine in a 2:1 weight ratio.

Example XV

To test tubes, equipped with stopper and gas escape tube leading to a cooled receiver, were charged roughly equal amounts of tetramethyldiphosphine disulfide and each of the metals indicated below. The mixtures were heated carefully and the results obtained were as follows:

Lead: Quick reaction giving tetramethyldiphosphine as distillate.

Tin: Quick reaction giving tetramethyldiphosphine as distillate, although the reaction was apparently somewhat less effective than when lead was used.

Antimony: Quick reaction giving tetramethyldiphosphine as distillate.

*Example XVI*

12.1 grams of tetraethyldiphosphine (0.05 mole) and 11.2 grams (0.2 gram atom) of ferrum reductum were heated together using the method of previous examples. On redistillation of the distillate tetraethyldiphosphine, boiling at 220 to 221° C., was obtained as a product.

*Example XVII*

29.3 grams (0.1 mole) of tetra-n-propyldiphosphine disulfide was mixed with 33.6 grams (0.6 gram atom) of ferrum reductum and heated as described in the previous examples. Fractional distillation of the distillate gave 15.3 grams of tetra-n-propyldiphosphine, boiling at 115° C. at 5 mm. Hg, representing a 65.2% yield of product. The tetra-n-propyldiphosphine is a clear, colorless, viscous, fuming and somewhat pyroforic liquid.

*Example XVIII*

Following the procedure of the previous examples, 7 grams (0.02 mole) of tetra-n-butyldiphosphine disulfide was mixed with 6.6 grams (0.12 gram atom) of iron reductum and heated until reaction occurred. A 75% yield of crude tetra-n-butyl disphosphine was obtained as a product.

*Example XIX*

In a two-neck flask equipped with gas-inlet tube and descending condenser 8.0 grams crude tetratolydiphosphine disulfide were thoroughly mixed with 6.2 grams active copper and heated for 10 minutes to 250° C. (oil-bath temperature) in a hydrogen current. In a vacuum, the pressure was slowly reduced to 2 mm. Hg and the major amount of the resultant ditolylphosphine distilled over. Finally, the oil-bath temperature was raised to 320° C., whereupon the rest of the phosphine was obtained. The distillate was fractionated again at 2 mm. Hg at 122 to 124° C. at 2 mm. Hg. 4.9 grams of pure ditolylphosphine were obtained, corresponding to a yield of 70%.

*Example XX*

8.7 grams tetraphenyldiphosphine disulfide were treated with 7.4 grams active copper using the method described in Example XIX. The distillate was fractionated at 26 mm. Hg. and the fraction obtained between 164 to 166° C. was collected.

Yield: 5.6 grams=75% of the theory.

*Example XXI*

In a 25-ml.-flask equipped with a condenser and a gas-inlet tube, 8.5 grams crude tetratolyldiphosphine disulfide and 6.6 grams finely powdered electrolytic copper were heated to 220° C. for 2 hours (nitrogen atmosphere). After cooling, the mixture was extracted three times with 10 ml. each of dry benzene and then filtered via a glass-frit (nitrogen atmosphere). After the benzene had been distilled off (the last part of the distillation was carried out in a vacuum), the crude tetratolyldiphosphine remained as a solid product.

Yield: 6.5 grams=87% of the theory.

*Example XXII*

8.7 grams tetraphenyldiphosphine disulfide were treated with 7.4 grams of very finely powdered electrolytic copper, using the method described in Example XXI. 6.7 grams crude tetraphenyldiphosphine were obtained, corresponding to 90% of the theory.

We claim:

1. Method of desulfurizing tetraorganodiphosphine disulfides comprising reacting a tetraorganodiphosphine disulfide having the formula

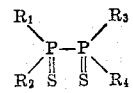

wherein $R_1$, $R_2$, $R_3$ and $R_4$ are members selected from the group consisting of lower alkyl, lower alkaryl, aryl lower alkyl, cycloalkyl and aryl radicals with an inorganic reductant selected from the group consisting of metals of the 4th, 5th and 6th periods of groups IB, IIB, IVA, VA and VIII of the periodic table and metal hydrides of alkali and alkaline earth metals at an elevated temperature and recovering a disulfurized phosphine from the reaction mixture.

2. Method according to claim 1 wherein the reaction is conducted in the presence of an inert solvent.

3. Method according to claim 1 wherein the inorganic reductant is a metal hydride and the desulfurized phosphine is a metal salt of a diorganophosphine.

4. Method of desulfurizing tetraorganodisphosphine disulfides comprising heating a tetraorganodiphosphine disulfide having the formula

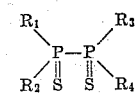

wherein $R_1$, $R_2$, $R_3$ and $R_4$ are members selected from the group consisting of lower alkyl, lower alkaryl, aryl lower alkyl, cycloalkyl, and aryl radicals in the presence of at least a stoichiometric quantity of an inorganic reductant selected from the group consisting of metals of the 4th, 5th and 6th periods of groups IB, IIB, IVA, VA, and VIII of the periodic table and metal hydrides of alkali and alkaline earth metals to a temperature of about 125 to 350° C., and recovering by distillation a tetraorganodiphosphine, having the formula

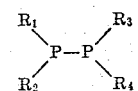

wherein $R_1$, $R_2$, $R_3$ and $R_4$ are as is defined hereabove, as it is formed.

5. Method according to claim 4 wherein said reductant is copper.

6. Method according to claim 4 wherein said reductant is reduced iron.

7. Method according to claim 4 wherein $R_1$, $R_2$, $R_3$ and $R_4$ are lower alkyl.

8. Method according to claim 4 wherein $R_1$, $R_2$, $R_3$ and $R_4$ are aryl.

9. Method according to claim 4 wherein $R_1$, $R_2$, $R_3$ and $R_4$ are lower alkaryl.

10. Method of desulfurizing tetraorganodiphosphine disulfides comprising gradually heating a tetraorganodiphosphine disulfide having the formula

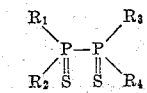

wherein $R_1$, $R_2$, $R_3$ and $R_4$ are members selected from the group consisting of lower alkyl, lower alkaryl, aryl lower alkyl, cycloalkyl and aryl radicals in an atmosphere of hydrogen in the presence of at least a stoichiometric quantity of an inorganic reductant selected from the group consisting of metals of the 4th, 5th and 6th periods of groups IB, IIB, IVA, VA and VIII of the periodic table and metal hydrides of alkali and alkaline earth metals to a temperature of about 125 to 350° C., and recovering a diorganophosphine from the reaction mixture.

11. Method according to claim 10 wherein said reductant is Raney copper.

12. Method according to claim 10 wherein $R_1$, $R_2$, $R_3$ and $R_4$ are lower alkyl.

13. Method according to claim 10 wherein $R_1$, $R_2$, $R_3$ and $R_4$ are aryl.

14. Method according to claim 10 wherein $R_1$, $R_2$, $R_3$ and $R_4$ are lower alkaryl.

References Cited in the file of this patent

Issleib et al.: Chem. Ber., vol. 92, No. 3, pp. 704–11 (Mar. 12, 1959), abstracted in Chem. Abs., vol. 53 p. 13990 (Aug. 10, 1959).

UNITED STATES PATENT OFFICE
CERTIFICATE OF CORRECTION

Patent No. 3,012,075                              December 5, 1961

Heinz Niebergall et al.

It is hereby certified that error appears in the above numbered patent requiring correction and that the said Letters Patent should read as corrected below.

Column 1, line 19, for "S.N. 77,045" read -- S.N. 779,045 --; column 3, lines 5 and 6, for "tetroorganodiphosphine" read -- tetraorganodiphosphine --.

Signed and sealed this 1st day of May 1962.

(SEAL)
Attest:

ERNEST W. SWIDER                                    DAVID L. LADD
Attesting Officer                                       Commissioner of Patents